3,272,676
METHOD OF EFFECTING THE ADHESION OF
POLYESTER MATERIALS TO RUBBERS
Koji Kigane and Shinichi Yamada, Iwakuni-shi, Yamaguchi-ken, and Yukinori Isozaki, Ohtake-shi, Hiroshima-ken, Japan, assignors to Teikoku Jinzo Kenshi Kabushiki Kaisha, Osaka, Japan, a corporation of Japan
No Drawing. Filed Sept. 11, 1962, Ser. No. 222,968
Claims priority, application Japan, Sept. 14, 1961, 36/33,532; Sept. 14, 1961, 36/33,533; Sept. 19, 1961, 36/33,952; Sept. 19, 1961, 36/33,953
14 claims. (Cl. 156—315)

This invention relates to a method of improving the adhesion of polyester materials, particularly polyester textile materials, to rubber or its substitutes (hereinafter to be referred to as rubbers). More particularly, the invention relates to an improved method for effecting the adhesion to rubbers of polyester materials containing high molecular weight polyesters, such materials including filaments, fibers, yarns, strands, cords, cord-fabrics, films and the like.

The polyesters as used in the invention are the high molecular weight polyesters obtained from $\alpha,\omega$-glycols and dicarboxylic acids, particularly any one of the high molecular weight polyesters obtained from polymethylene glycols and the aromatic dicarboxylic acids. As the most typical of these can be cited polyethylene terephthalate that is obtained from ethylene glycol and terephthalic acid.

The rubbers as used in the invention include any one of the natural rubbers such as Hevea rubber, gutta-percha, balata; the compounded rubbers; the modified rubbers, for example, hydroxylated rubber; the condensated derivatives of rubber and cyclic rubber; the synthetic rubbery diene polymer and/or copolymer, for example, neoprene, butadiene-styrene copolymer and butadiene-acryonitrile copolymer, thioplasts; the rubbery isobutylene polymer and/or copolymer; the rubbery copolymer of alkyl acrylate and chloroalkyl vinyl ether; the chlorosulfonated polyolefines, etc.

The polyester fibers notwithstanding the fact that on one hand they possess properties most desirable as reinforcing materials for rubbers, such as excellent tensile strength, shock resistance, stretch resistance, dimensional stability, heat resistance, chemical resistance, imperviousness to water, bacterial resistance and weatherability; on the other, due to the fact that their molecular structure is inactive, an adhesion force necessary for their practical application could not be obtained by the conventional adhesion treatments.

Namely, the adhesives such as, for example, the vinylpyridine copolymer latex-resorcinol-formaldehyde aqueous dispersion which has been proved heretofore to be commercially valuable in the adhesion of cellulosic textiles to rubbers does not give satisfactory results in case of the adhesion of polyester textiles to rubbers.

In view of the above, many proposals have been made as to the methods of effecting the adhesion of polyester textile materials to rubbers, the principal ones being:

(1) The isocyanate method;
(2) The ethyleneurea method;
(3) The water-stable isocyanate method; etc.

However, all of these have shortcomings as described below, and thus none are fully satisfactory.

The method listed as (1), above, is that in which polyester textiles are treated with a treatment liquor wherein has been dissolved or dispersed isocyanates, after which they are adhered to rubbers. However, according to this method there is required a large quantity of isocyanate, thus raising the cost. Moreover there is the matter of toxicity, and in addition its adhesive force is not sufficient.

In the method listed as (2), above, the polyester textiles are treated with a treatment liquor in which ethyleneurea has been dissolved or dispersed, after which they are adhered to rubbers. In this case also, ethyleneurea is required in large quantities as to make the process expensive, and in addition the adhesive force obtained is not sufficient for practical use.

In the method of (3), above, the polyester textiles are treated with an aqueous dispersion of water-stable isocyanate and latex, following which they are adhered to rubbers. This method is also unsatisfactory in that not only is it uneconomical because of the requirement for a large quantity of water-stable isocyanate, but also because by this single stage treatment adhesive force sufficient for practical applications is not obtainable.

A primary object of the invention is to provide a method of effecting the adhesion to rubbers of high molecular weight polyester-containing materials, particularly polyester textile materials.

Another object of the invention is to provide in the adhesion to rubbers of high molecular weight polyester-containing materials, particularly polyester textile materials, a method of imparting adhesion which manifests improved adhesiveness having high adhesive force and high breaking ratio at the H-piece test.

A particular object of the invention is to provide a method of effecting the adhesion to rubbers of materials containing polyethylene terephthalate, particularly polyethylene terephthalate textile materials.

A further object of the invention is to provide an improved method of effecting the adhesion to rubbers of textile materials obtained from polyethylene terephthalate for reinforcing articles made of rubbers.

Other objects and advantages of the present invention will be apparent from the following description.

The method of the invention by which the various aforementioned objects and advantages are attained comprises treating with a first treatment liquor containing at least one compound having at least two of the same group selected from the class consisting of the active isocyanate group, ethyleneurea group, ethyleneurethane group, and phenylurethane group, and a second treatment liquor containing at least one compound selected from the group consisting of the ethylenically unsaturated amide compounds and the ethylenically unsaturated epoxy compounds, then heat treating said treated material at a temperature of 100–250° C. followed by effecting the adhesion thereof to rubbers.

The treatment by means of the first and second treatment liquors in the method of the invention can be effected simultaneously. Namely, according to one of the features of the present invention, the polyester material can be treated with a treatment liquor containing at least one compound having at least two of the same group selected from the class consisting of the active isocyanate group, ethyleneurea group, ethyleneurethane group, and phenylurethane group, and at least one compound selected from the group consisting of the ethylenically unsaturated amide compounds and the ethylenically unsaturated epoxy compounds, then heat treated at a temperature of 100–250° C., following which its adhesion to rubbers is effected. This embodiment is referred to as a single-bath method at times.

According to the present invention, the treatments by the first and second treatment liquors may be carried out separately. This embodiment is referred to as a two-bath method at times. In the two-bath method, the material treated with the first treatment liquor containing a compound having either an ethyleneurea group, an ethyleneurethane group or a phenylurethane group is preferably heated to a temperature of 150–250° C. prior to its being treated with the second treatment liquor. Hence, in another embodiment of the invention, the polyester material can be treated with a first treatment liquor containing at least one compound having at least two of the same group selected from the class consisting of the active isocyanate group, ethyleneurea group, ethyleneurethane group, and phenylurethane group, then said material which has been treated with the first treatment liquor can be heat treated at a temperature of 150–250° C., following which said heat treated material is treated with a second treatment liquor containing at least one compound selected from the group consisting of the ethylenically unsaturated amide compounds and ethylenically unsaturated epoxy compounds, after which it is heat treated at a temperature of 100–250° C., and thereafter the adhesion of this material to rubbers is effected.

The first treatment liquor used in the invention contains at least one compound having at least two of the same group selected from the class consisting of the active isocyanate group, ethyleneurea group, ethyleneurethane group and phenylurethane group.

The following are examples of the foregoing compound that is used in the first treatment liquor;

Compounds having active isocyanate groups:

The polymethylene diisocyanates such as hexamethylene diisocyanate, 2,4-toluylene diisocyanate and the dimer thereof, 2,4-chlorophenylene diisocyanate, p,p'-diphenylmethane diisocyanate, p,p',p''-triphenylmethane triisocyanate, 1,5-naphthylene diisocyanate, and, di-trimethylene thioether diisocyanate.

Compounds having ethyleneurea groups:

The polymethylene bis(ethyleneurea) such as tetra-, penta-, hexa-, nona-, and deca-methylene bis(ethyleneurea), m-phenylene bis(ethyleneurea), 2,4-toluylene bis(ethyleneurea), and p,p'-diphenylmethane bis(ethyleneurea).

Compounds having ethyleneurethane groups:

The polymethylene bis(ethyleneurethane) such as tetra-, penta-, hexa-, hepta-, octa-, nona-, and deca-methylene bis(ethyleneurethane), and p,p'-dimethyl diphenylmethane bis(ethyleneurethane).

Compounds having phenylurethane groups:

The polymethylene bis(phenylurethane) such as hexamethylene bis(phenylurethane), polymethylene bis(phenylurethane), 2,4-toluylene bis(phenylurethane), 2,4-chlorophenylene bis(phenylurethane), p,p'-diphenylmethane bis(phenylurethane), p,p',p''-triphenylmethane tris (phenylurethane), 1,5-naphthylene bis(phenylurethane), and di-trimethylene thioether bis(phenylurethane).

The compounds that can be used in the first treatment liquor of this invention have been illustrated in further detail in our copending application U.S. Serial No. 147,166 filed October 24, 1961.

These compounds are normally contained in the first treatment liquor in an amount of about 2–15%.

The second treatment liquor as used in this invention contains at least one compound selected from the group consisting of the ethylenically unsaturated amide compounds and the ethylenically unsaturated epoxy compounds.

The term "ethylenically unsaturated amide compound" as used in the present specification and claims is meant to be a compound which has at least one ethylenically unsaturated bond and at least one acid amide bond in its molecule. As the ethylenically unsaturated amide compounds, there are included, for example, acryl amide, methacryl amide, and the N-alkyl acrylamides such as N-methyl, N-ethyl, N-n-propyl, N-iso-propyl, N-n-butyl, N-iso-butyl, N-tert-butyl and N-octyl acrylamide, N-allyl acrylamide, N-crotyl acrylamide, N-methylol acrylamide, N,N'-methylene bis(acrylamide), and similar derivatives of methacrylamide.

The term "ethylenically unsaturated epoxy compound" as used in the present specification and claims is a generic term of a compound which has in its molecule at least one group which has a three-membered ring of alkylene oxide, for example, an epoxy group, glycidyl group, etc. and has at the same time a group which has at least one ethylenically unsaturated bond, for example, a vinyl group, an allyl group, an acryl group, a methacryl group, etc. Typical of this kind of compound are, for example, glycidyl acrylate, glycidyl methacrylate, glycidyl crotonate, allyl epoxy stearate, allyl glycidyl ether, crothyl glycidyl ether, vinyl cyclohexene monoxide, and divinylbenzene monoxide.

These compounds are normally contained in the treatment liquor in an amount of 2–15%.

The treatment liquor may be either a solution, a dispersion, or an emulsion. When compounds having an active isocyanate group are not used but those having a group selected from the class consisting of the ethyleneurea group, ethyleneurethane group and phenylurethane group are used, these compounds, and as required, besides these compounds the foregoing ethylenically unsaturated amide compounds or ethylenically unsaturated epoxy compounds can be prepared into an aqueous liquor by dispersing or emulsifying in water, which can then be used as the first treatment liquor or as the combined treatment liquor.

The treatment liquor may also be an organic solvent type liquor.

What is referred to here as the organic solvent type liquor is meant the organic solvent in its ordinary sense. It may be any organic solvent so long as it is not reactive with respect to the functional groups of the compound that is to be dissolved, dispersed, or emulsified therein, it being not necessarily required that it be a solvent of said compound. Included as examples of those organic solvents that are suitable in the present invention are: the aliphatic hydrocarbons such as hexane, the aromatic hydrocarbons such as benzene, the ethers such as butyl ether, the ketones such as methyl ethyl ketone, the esters such as ethyl acetate, the halogenated hydrocarbons such as dichloromethane, the nitro compounds such as nitromethane, the nitriles such as acetonitrile, and the sulfur compounds such as ethyl sulfide.

Again, in case of the two-bath method, the solvent of the first treatment liquor and that of the second may be different. For instance, the material which has been treated with an organic first treatment liquor can, after air drying or heat treating, be treated with an aqueous second treatment liquor.

In the embodiment of the invention in which a compound having the active isocyanate groups is not used, the addition to the first treatment liquor (inclusive of the instance of the single-bath method) of a small quantity of a compound having an amine group is desirable.

As the compounds having an amine group which can be used for this purpose there can be named such as the primary, secondary and tertiary amines, polymerized amino compounds and the quaternary hydroxylammonium compounds.

The amino compounds especially desirable for use in the invention include the aliphatic diamines such as ethylene diamine, trimethylene diamine, tetramethylene diamine, pentamethylene diamine, hexamethylene diamine, heptamethylene diamine, octamethylene diamine and nonamethylene diamine; the polymerized aliphatic polyamines such as triethylene diamine, tetraethylene triamine, etc.; the aromatic amines such as aniline, N-methyl aniline, N,N-dimethyl aniline, diamino benzene, etc.; the cycloaliphatic amines such as piperidine; the heterocylic amines such as pyridine; and also other compounds such as urea, thiourea, diphenyl urea and diphenyl thiourea.

The amino compound may be added to the treatment liquor containing a compound having at least two of the same group selected from the class consisting of the ethyleneurea group, ethyleneurethane group and phenylurethane group in an amount up to 0.3 equivalent of the amino group to each equivalent of said functional groups. However, in most cases, the amount of 0.01–0.1 equivalent is particularly suitable. On the other hand, if the amount added of the amine exceeds 0.3 equivalent of the amino group to each equivalent of the functional groups, the adhesive force obtained decreases instead.

The treatment liquor as used in method of the invention may also contain other suitable additives such as follows:

(1) A dispersing agent such as Aerosol OT (trade name of American Cyanamid Co.—sodium dioctyl sulfosuccinate) for dispersing the effective compound in water or an organic solvent.

(2) An emulsifier such as polyvinyl alcohol (PVA), sodium carboxyl methyl cellulose (CMC) or sodium alginate when emulsifying the effective compound in water or an organic solvent.

(3) Natural rubber latex, butadiene vinylpyridine copolymer latex or raw rubber organic solutions for imparting flexibility to the polyester materials which have been applied the first coating. Then additives of (2) and (3), above, serve also as the viscosity controlling agent of the treatment liquor. Namely, by giving to the treatment liquor a viscosity suitable for use they have the action of controlling the pick up of the treatment liquor by polyester materials.

Additionally, if required, the treatment liquor may also contain a catalyst such as benzoyl peroxide.

Treatment of the polyester materials with the treatment liquor may be by any suitable method. While the treatment liquor may be applied to the material to be treated by means of a sprayer or by brush, it is generally preferred to dip the polyester material, with or without tension, in the treatment liquor and remove it therefrom with a suitable pick up.

According to the method of this invention, the solid pick up is not critical. Generally in the adhesion of polyester materials to rubbers, the optimum quantity of solid pick up for the polymeric coating that will give the maximum adhesive force will vary depending upon the uses to which the intended product is to be put and the form of the polyester material. Moreover, with there being instance, depending upon its use in which a maximum adhesive force is not necessarily required, in the practicing of the method of the invention it is preferred that in accordance with the uses to be put of the intended articles and the form of the polyester materials used treatments commensurate with the ends to be achieved be given, with an awareness as to the optimum quantity of the solid pickup for the polymeric coating, i.e., by selection of the concentration in the treatment liquor of the compound having the effective functional groups and the pick up of said liquor, so as to obtain the optimum quantity of solid pick up.

The optimum range for the solid pick up is suitably determined in accordance with the kind, form, and intended uses of material to be treated. For instance, in the case of a tire cord, the solid pick up of the adhesive is normally in the range of 0.3–6% by the first dipping and is also about the same by the second dipping. Thus, the total solid pick up is normally in the range of 0.6–12%. On the other hand, in case of the single-bath method, a solid pick up of 0.4–8% is normal.

In treating cable cords, in most instances a solid pickup that is 10–40% less than that when tire cords are being treated is sufficient.

While the solid pick up in treating fabrics will vary depending on whether the fabric is woven from filament yarns or spun yarns, or on its weave structure, thickness, etc., generally the treatment in most cases is effected so that the total solid pick up becomes 0.3–12%.

In the single-bath method, the polyester material that has been treated at the same time with the first as well as second treatment liquor, as described hereinbefore, must then be heated at temperatures between 100–250° C., preferably 170–230° C. This heat treatment heat activates, addition polymerizes and/or condensation polymerizes the compound having a group selected from the class consisting of the active isocyanate group, ethyleneurea group, ethyleneurethane group and phenylurethane group and the ethylenically unsaturated amide compound or ethylenically unsaturated epoxy compound in the treatment liquor the adhesion of which has been effected to the surface of the polyester material, and is an indispensable condition for forming the polymeric coating that is firmly bonded to the polyester on the surface of the material being treated and moreover is capable of being bonded firmly to rubbers. At a heating temperature of less than 100° C., the formation of the polymeric coating not being adequate and the adhesive force obtained being also small, the objective of the present invention cannot be attained. On the other hand, if the treatment is effected at a heating temperature above 250° C., there is the tendency that the polyester materials used are deleteriously affected.

The heat treatment time will vary depending on the material being treated, the kind of bonding agent, wet pick up, and particularly the heat treatment temperature. While normally a time ranging between 20 seconds and 6 minutes will suffice, at times it may be as short as 10 seconds or so or as long as about 10 minutes.

In the manufacture of tire cords or cable cords heat setting of the cords under tension is usually practiced for the purpose of lessening the tendency of the cords to stretch under loads or to shrink during the vulcanizing process of rubber. According to the present invention, the heat treatment given for forming the polymeric coating fortunately can also serve at the same time for heat setting the cord itself. Furthermore, particularly in case the material being treated happens to be polyethylene terephthalate, if that heat setting and the heat treatment for forming the polymeric coating are performed together under a tension permitting the shrinkage of the cord, the performance characteristics of the tire are markedly improved.

In effecting the adhesion to rubbers of the polyester materials the formation of whose polymeric coating has been completed, the matter of changes occurring because of lapse of time has no effects needing consideration in commercial scale production. Even after a lapse of two weeks, hardly any decrease was observed in the adhesive force as finally obtained.

The polyester materials which have been imparted the polymeric coating is adhered to rubbers. Generally, this final adhesion is effected at the same time the vulcanization of the rubber is effected. Namely, the polyester materials imparted the coating is heated together with rubbers. If desired, this heating may be done under pressure.

In the two-bath method, the polyester material can be treated with a method which comprises treating it with a first treatment liquor containing at least one compound having at least two of the same group selected from the class consisting of the active isocyanate group, ethyleneurea group, ethyleneurethane group and phenylurethane group, heat treating at a temperature of 150–250° C. this material which has been treated with the first treatment liquor, then treating this heat treated material with a second treatment liquor containing at least one compound selected from the group consisting of the ethylenically unsaturated amide compounds and the ethylenically unsaturated epoxy compounds followed by heat treating at a temperature of 100–250° C. the material treated with the second treatment liquor and thereafter effecting the adhesion thereof to rubbers.

In this instance, the compound in the first treatment liquor having at least two of the same group selected from the class consisting of the active isocyanate group, ethyleneurea group, ethyleneurethane group and phenylurethane group, which has been picked up on the surface of the polyester material, is by the first heat treatment heat activated, addition polymerized and/or condensation polymerized to effect its firm bonding to the surface of the material being treated. Thus there is formed a first coating comprising a nitrogen-containing cohesion high polymer that can crosslink with the second coating which results from the second treatment liquor.

The polyester materials imparted the first coating according to the method of the invention, as intermediate products, possess full stability as will not impair their marketable value. The polyester materials imparted the first coating, even when left exposed to the air for a long number of hours were not affected by humidity, oxygen or sunlight, nor was there observed any change at all in the final adhesive force that they had acquired.

In the examples of the invention there is given an instance of a cord having a first coating which was put to satisfactory use even after left standing in a room for a one-year period. If desired, the polyester fibers imparted the first coating can also be woven, and thereafter the fabric so obtained can be adhered to rubbers by treating as described hereinafter.

The polyester material which has already been given the first coating is treated with the second treatment liquor containing normally 2–15% of an ethylenically unsaturated amide compound or an ethylenically unsaturated epoxy compound and thereafter baked normally from 20 seconds to 6 minutes at a temperature of 100–250° C., preferably 160–230° C., whereby the second coating is formed on the polyester material which had previously been imparted the first coating.

The second treatment liquor may be either a solution, a dispersion, or an emulsion. Again, it may be either an aqueous or an organic solvent type of liquor. And, if necessary, it can also contain a catalyst such as benzoyl peroxide.

The second coating is also relatively stable. Even after a lapse of two weeks, hardly any decrease could be observed in the adhesive force as finally obtained.

The polyester material which has been imparted the first and second coatings is adhered to rubbers as in the case already described hereinbefore with reference to the single-bath method.

Furthermore, when the material to be treated is a cord or cord fabric, the heat treatment given after treatment with the first treatment liquor or that given after the treatment with the second treatment liquor can also serve at the same time for heat setting the cord itself.

In order for a better understanding of the present invention, the following examples are given. In the examples, all parts are by weight unless otherwise indicated.

EXAMPLE 1

| | Parts |
|---|---|
| Desmodur R | 50 |
| 30% solution of natural rubber in methylene chloride | 10 |
| 5% dispersion of N,N′-methylene bis(acrylamide) in methylene chloride | 40 |

The above components were mixed with stirring thereby obtaining the treatment liquor to be used for adhesion. Desmodur R is a product of Farbenfabriken Bayer A.G. and is a 20% solution of triphenylmethane triisocyanate in methylene chloride. This treatment liquor contains 10% of triphenylmethane triisocyanate, 3% of natural rubber and 2% of N,N′-methylene bis(acrylamide).

A polyethylene terephthalate tire cord ($250^{de}/4/2$, 51S x 51Z turns/10 cm.) was dipped in the above treatment liquor, and after bringing the wet pick up of the treated cord to 34% by means of squeezing rolls, it was heat treated for 1.5 minutes at 180° C. The heat treated cord was embedded in unvulcanized natural rubber and while effecting vulcanization at 15 kg./cm.$^2$ and 135° C. for 50 minutes the adhesion thereof was simultaneously effected. The unvulcanized natural rubber that was used had the following composition:

| | Parts |
|---|---|
| Smoked sheet of natural rubber | 100 |
| Zinc oxide | 20 |
| Dibenzothiazil disulfide | 1 |
| Cumarone resin | 2.5 |
| Stearic acid | 3 |
| Carbon black | 50 |
| Phenyl β-naphthylamine | 1 |
| Sulphur | 3 |

When 20 pieces of the so obtained samples were measured for their adhesive force by the H-piece test, the results obtained were: average value 9.8 kg., maximum value 11.5 kg., and minimum value 7.9 kg.

EXAMPLE 2

4.5 parts of hexamethylene bis(ethyleneurea) and 83.0 parts of water were charged into a ball mill and the mixture was dispersed and dissolved for 24 hours. After filtering off the insoluble components, to the filtrate obtained was added 2.5 parts of N,N′-methylene bis(acrylamide) which was then agitated with a high speed mixer thereby effecting the complete dissolution of the mixture. Then after adjusting the pH to 6.0 with a ½ N caustic soda solution, 10 parts of butadiene vinylpyridine latex containing 40% solids was added. The aqueous solution of hexamethylene bis(ethyleneurea) is fairly stable if the pH of the solution is at least 4.

Using the Computreater dipping machine of C. A. Litzler Co., Inc., a polyethylene terephthalate tire cord ($250^{de}/4/2$, 51S x 51Z turns/10 cm.) was dipped in the foregoing treatment liquor. After heat treating the material whose wet pick up was about 21%, it was embedded in the unvulcanized natural rubber sheet described in Example 1 followed by vulcanizing for 50 minutes at 15 kg./cm.$^2$ and 135° C. in a mold for the H-piece test.

The average adhesive force (average of 20 measurements) of the products obtained by the H-piece test together with the treatment temperatures and times was as shown in Table I.

Table I.—Average adhesive force by H-piece test (kg.)

| Temperature (° C.) | Time (min.) | | | |
|---|---|---|---|---|
| | 1.5 | 2 | 2.5 | 3 |
| 220 | 10.6 (5.1) | 10.2 (5.2) | 9.7 (5.5) | 8.5 (4.8) |
| 200 | 12.1 (4.6) | 12.5 (3.8) | 11.8 (4.6) | 11.4 (4.9) |
| 180 | 11.3 (3.3) | 12.3 (4.1) | 12.8 (4.3) | 12.0 (4.1) |

Remarks: The values in parentheses are those of controls in which the treatment liquor used was that to which N,N′-methylene bis(acrylamide) was not added.

EXAMPLE 3

5 parts of hexamethylene bis(ethyleneurea) was dispersed in 94.5 parts of an aqueous caustic soda solution using 0.5 part of sodium alginate, the undissolved portion being filtered off. To 92.5 parts of this filtrate was added 2.5 parts of t-butyl acrylamide which was dissolved and dispersed with a homomixer. To this was added 5.0 parts of Gentac latex containing 40% solids (a product of General Tire and Rubber Company) and then by stirring gently with a glass rod the treatment liquor was obtained. As in Example 2, a polyethylene terephthalate tire cord was immersed in this liquor, squeezed to a wet pick up of about 18% with squeeze rolls and then heat treated, after which the vulcanizing (136° C., 15 kg./cm.$^2$, 50 min.) of this cord and simultaneously its adhesion were effected. The results of the H-piece test of this cord was as shown in Table II.

*Table II.—Adhesive force by H-piece test (kg.)*

| Heat Treatment Time (min.) | Heat Treatment Temperature | |
|---|---|---|
| | 160° C. | 180° C. |
| 1 | 7.2 | 8.0 |
| 2 | 8.2 | 8.7 |
| 3 | 9.1 | 9.0 |
| 4 | 9.4 | 8.9 |
| 5 | 9.8 | 8.5 |

EXAMPLE 4

Five parts of p,p' - diphenylmethane bis(phenylurethane) was added with 0.5 part of sodium alginate to 94.5 parts of an aqueous caustic soda solution having a pH of 9 and was dispersed and dissolved in a ball mill for 24 hours. After filtering off the undissolved portion, while adding to 92 parts of the filtrate 3 parts of t-butyl acrylamide the mixture was dispersed and dissolved with a homomixer. Then to this was added 5 parts of a 40% Gentac latex, and by stirring gently with a glass rod the treatment liquor was obtained. The pH of this treatment liquor was adjusted to 8.5–9.5 with a 1 N caustic soda aqueous solution. As in Example 2, a polyethylene terephthalate cord was dipped in this treatment liquor, after which it was heat treated. The vulcanizing and adhesion of this cord with the unvulcanized natural rubber described in Example 1 was then effected. When the H-piece test was carried out on the samples, the results were as shown in Table III, below.

*Table III.—Adhesive force by H-piece test (kg.)*

| Heat Treatment Time (min.) | Heat Treatment Temperature | |
|---|---|---|
| | 200° C. | 170° C. |
| 1 | 8.5 | 8.3 |
| 1.5 | 8.8 | 8.5 |
| 2.0 | 9.5 | 9.0 |
| 2.5 | 9.5 | 9.8 |
| 3.0 | 9.4 | 9.9 |
| 4.0 | 9.3 | 10.0 |
| 5.0 | 9.0 | 9.8 |

EXAMPLE 5

When treatments were carried out as in Example 2 using a treatment liquor in which amines were incorporated in accordance with the conditions shown in Table IV to a treatment liquor in which was used p,p'-diphenylmethane bis(phenylurethane) instead of the hexamethylene bis(ethyleneurea) of Example 2, the results obtained were as in Table IV.

*Table IV.—Effects of incorporation amines*

| Exp. No. | Kind of Amine | Amount Added (based on 100 pts. of treatment liquor) | Heat Treatment Conditions | | Adhesive Force by H-Piece Test (kg.) |
|---|---|---|---|---|---|
| | | | (° C.) | (min.) | |
| 1 | Ethylene diamine | 0.060 | 180 | 1 | 12.8 |
| 2 | ----do---- | 0.060 | 180 | 2 | 10.6 |
| 3 | Aniline | 0.093 | 200 | 1 | 11.6 |
| 4 | ----do---- | 0.093 | 200 | 2 | 10.3 |
| 5 | Piperidine | 0.085 | 180 | 1 | 12.6 |
| 6 | ----do---- | 0.085 | 220 | 2 | 9.4 |
| 7 | Pyridine | 0.079 | 180 | 1 | 11.9 |
| 8 | ----do---- | 0.079 | 180 | 2 | 10.5 |
| 9 | None | | 180 | 1 | 8.5 |
| 10 | ----do---- | | 180 | 2 | 10.3 |
| 11 | ----do---- | | 220 | 2 | 10.8 |

EXAMPLE 6

To 890 ml. of water adjusted to a pH of 8.5–9.0 were added 50 grams of toluylene bis(phenylurethane) and 8.5 grams of a dispersing agent Aerosol OT, which was dispersed in a ball mill for 24 hours, after which with thorough stirring of the dispersion with a homomixer 21.5 grams of glycidyl methacrylate was gradually added and complete emulsification was effected.

To this were mixed 20 grams of a 40% Gentac latex and 10 grams of natural latex, and by gently stirring with a glass rod the treatment liquor was obtained. When a polyethylene terephthalate tire cord ($250^{de}/4/2$, 51S x 51Z turns/10 cm.) was immersed in this treatment liquor for several tens of seconds and immediately thereafter heat treated for 1.8 minutes at 220° C., the treatment liquor was polymerized on the fibers and formed a firm coating.

This was embedded in the unvulcanized natural rubber sheet described in Example 1 and vulcanized as in Example 1. When measured for its adhesive force by the conventional H-piece test, the adhesive force ranged between 8.0 and 10.5 kg.

EXAMPLE 7

After 65 grams of hexamethylene bis(ethyleneurea) was dispersed in water adjusted to pH 9.0 with a 1 N caustic soda solution, 10 grams of a viscosity raising agent CMC and 5 grams of a dispersing agent Aerosol OT were added thereto, following which the total volume of the aqueous solution was brought to 1 liter.

To this was then added 35 grams of glycidyl methacrylate by the same procedures as in Example 6. Then, after adding to this mixture 0.25 gram of pyridine followed by mixing in 50 grams of a 40% Gentac latex, the resultant mixed liquor was used as the treatment liquor. A heavy weight staple fiber fabric woven from polyethylene terephthalate fibers was immersed in this liquor and after squeezing with squeezing rolls to a wet pick up of about 90%, it was heat treated for 5.5 minutes at 180° C. When the vulcanization and adhesion operation of this treated fabric was effected as in Example 1, it had a stripping adhesive force of an average of 9.0 kg./inch, a maximum of 10.4 kg./inch, and a minimum of 6.2 kg./inch. This adhesive force is very remarkable when compared with that of the blank test which was about 2.5 kg./inch.

EXAMPLE 8

When instead of the toluylene bis(phenylurethane) of Example 6, 50 grams of hexamethylene bis(ethyleneurea) was used, the adhesive force by means of the H-piece test was 8.3–10.4 kg.

EXAMPLE 9

When instead of the toluylene bis(phenylurethane) of Example 6, 61 grams of p,p'-diphenylmethane bis(phenylurethane) was used and instead of glycidyl methacrylate 18 grams of allyl glycidyl ether was used, the adhesive force by means of the H-piece test was 8.8–10.6 kg.

EXAMPLE 10

Eight parts of hexamethylene bis(ethyleneurea) was together with 0.7 part of Aerosol OT dispersed in 177.0 parts of water for 24 hours in a ball mill. After filtering off the undissolved portion, the filtrate was made the first treatment liquor. A polyethylene terephthalate tire cord (250$^{de}$/4/2, 51S x 51Z turns/10 cm.) was dipped in this first treatment liquor, after which it was heat treated. Then this was dipped in a mixed liquor consisting of 2.5 parts of N,N'-methylene bis(acrylamide), 7.5 parts of a 40% Gentac latex and 90 parts of water. After effecting the heat treatment of this treated cord, it was vulcanized by hot pressing for 50 minutes at a temperature of 136° C. and a pressure of 15 kg./cm.$^2$.

The results of measurement by the H-piece test were as shown in Table V.

*Table V.—Adhesive force and cord break [1] by H-piece test*

| Heating Conditions for Forming First Coating. | Temperature (° C.) | 220 | | | | | | | | 200 | | | |
|---|---|---|---|---|---|---|---|---|---|---|---|---|---|
| | Time (min.) | 2 | | | | 2.5 | | | | 2 | | | |
| Heating Conditions for Forming Second Coating. | Temperature (° C.) | 200 | | 170 | | 200 | | 170 | | 200 | | 170 | |
| | Time (min.) | 2 | 2.5 | 2 | 2.5 | 2 | 2.5 | 2 | 2.5 | 2 | 2.5 | 2 | 2.5 |
| Adhesive Force (kg.) | | 9.8 | 8.0 | 12.3 | 12.3 | 8.5 | 7.8 | 12.0 | 11.8 | 9.5 | 9.0 | 12.0 | 12.3 |
| Cord Break (percent) | | 0 | 0 | 70 | 70 | 0 | 0 | 60 | 60 | 10 | 0 | 60 | 70 |

| Heating Conditions for Forming First Coating. | Temperature (° C.) | 200 | | | | 180 | | | | | | | |
|---|---|---|---|---|---|---|---|---|---|---|---|---|---|
| | Time (min.) | 2.5 | | | | 2 | | | | 2.5 | | | |
| Heating Conditions for Forming Second Coating. | Temperature (° C.) | 200 | | 170 | | 200 | | 170 | | 200 | | 170 | |
| | Time (min.) | 2 | 2.5 | 2 | 2.5 | 2 | 2.5 | 2 | 2.5 | 2 | 2.5 | 2 | 2.5 |
| Adhesive Force (kg.) | | 9.3 | 8.9 | 12.4 | 12.3 | 11.0 | 11.0 | 12.5 | 12.5 | 10.9 | 10.8 | 12.3 | 12.2 |
| Cord Break (percent) | | 0 | 0 | 70 | ------ | 50 | 50 | 90 | 90 | 30 | 30 | 70 | 70 |

[1] Cord break is a value expressed in percentage of the number of samples in which cord breaks occurred to the total number of samples.

EXAMPLE 11

Substantially the same procedures were followed as in Example 10, except that as the first treatment liquor that to which was added further 0.15 part of pyridine was used, the heat treatment subsequent to the treatment by the first treatment liquor was for 1 minute at 220° C., and the heat treatment subsequent to the treatment by the second treatment liquor was for 2 minutes at 170° C. The adhesive force of the cord so treated was 12.8 kg. and the cord break, 100%. The treatment in accordance with this example manifested adhesiveness that was substantially superior to the case in which pyridine was not used.

EXAMPLE 12

Except that 2.0 parts of N-methylol acrylamide was used instead of N,N'-methylene bis(acrylamide), the heat treatment conditions subsequent to the treatment by the first treatment liquor was 2 minutes at 200° C., and the heat treatment conditions following the treatment by the second treatment liquor was 2 minutes at 170° C., substantially the same procedures were followed as in Example 10. The adhesive force by means of the H-piece test of the samples obtained was 10.8 kg.

EXAMPLE 13

Except that 4 parts of hexamethylene bis(ethyleneurea) and 4 parts of p,p'-diphenyl methane bis(phenylurethane) were used instead of the 8 parts of hexamethylene bis(ethyleneurea) of Example 10, otherwise the same conditions were used as in said example in carrying out the treatment of a polyethylene terephthalate cord. The results were as shown in Table VI.

*Table VI.—Adhesive force and cord break by H-piece test*

| Heating Conditions for Forming First Coating. | Temperature (° C.) | 200 | | 180 | |
|---|---|---|---|---|---|
| | Time (min.) | 2 | 2.5 | 2 | 2.5 |
| Heating Conditions for Forming Second Coating. | Temperature (° C.) | 170 | 170 | 170 | 170 |
| | Time (min.) | 2.5 | 2.5 | 2.5 | 2.5 |
| Adhesive Force (kg.) | | 12.1 | 12.5 | 12.3 | 12.5 |
| Cord Break (percent) | | 50 | 60 | 60 | 60 |

EXAMPLE 14

Five parts of hexamethylene bis(ethyleneurea) together with 0.5 part of Aerosol-OT was dispersed and dissolved for 24 hours in 94.5 parts of an aqueous caustic soda solution (pH=9) by means of a ball mill. After filtering off the undissolved portion, the filtrate was used as the first treatment liquor. The second treatment liquor was obtained by dissolving and dispersing 3 parts of t-butyl acrylamide in 92 parts of water by means of a homomixer, then adding to this 5 parts of a 40% Gentac latex followed by gently stirring with a glass rod. The pH of the second treatment liquor was adjusted to 8.0–9.0 by means of an aqueous caustic soda solution. A polyethylene terephthalate tire cord (250$^{de}$/4/2, 51S x 51Z turns/10 cm.) which was dipped in the first treatment liquor and heat treated was dipped in the second treatment liquor and heat treated. The vulcanization and adhesion of this treated cord to the unvulcanized rubber was effected as in Example 1. The results of the H-piece test of the cord samples obtained were as in Table VII, below.

*Table VII.—Adhesive force and cord break by H-piece test*

| Heating Conditions for forming First Coating. | Temperature (° C.) | 220 | | | | | | 200 | | | |
|---|---|---|---|---|---|---|---|---|---|---|---|
| | Time (min.) | 2 | | 3 | | | | 2 | | | |
| Heating Conditions for forming Second Coating. | Temperature (° C.) | 200 | | 180 | | 200 | | 180 | | 200 | | 180 | |
| | Time (min.) | 2 | 3 | 2 | 3 | 2 | 3 | 2 | 3 | 2 | 3 | 2 | 3 |
| Adhesive Force (kg.) | | 9.0 | 9.0 | 11.9 | 11.8 | 9.0 | 8.9 | 12.0 | 11.9 | 12.0 | 11.9 | 12.5 | 12.4 |
| Cord Break (percent) | | 0 | 0 | 30 | 30 | 0 | 0 | 60 | 40 | 40 | 20 | 90 | 90 |

| Heating Conditions for forming First Coating. | Temperature (° C.) | 200 | | | | 180 | | | | | | | |
|---|---|---|---|---|---|---|---|---|---|---|---|---|---|
| | Time (min.) | 3 | | | | 2 | | | | 3 | | | |
| Heating Conditions for forming Second Coating. | Temperature (° C.) | 200 | | 180 | | 200 | | 180 | | 200 | | 180 | |
| | Time (min.) | 2 | 3 | 2 | 3 | 2 | 3 | 2 | 3 | 2 | 3 | 2 | 3 |
| Adhesive Force (kg.) | | 12.4 | 12.5 | 12.9 | 12.7 | 12.8 | 12.9 | 12.9 | 12.9 | 12.8 | 12.9 | 12.7 | 12.8 |
| Cord Break (percent) | | 90 | 90 | 100 | 90 | 100 | 100 | 100 | 100 | 90 | 100 | 100 | 90 |

EXAMPLE 15

Eight parts of p,p'-diphenylmethane bis(phenylurethane) together with 0.5 part of Aerosol OT was dispersed and dissolved in 91.5 parts of water using a ball mill for 24 hours. The undissolved portion was filtered off and the filtrate was made the first treatment liquor. Next, 2.5 parts of t-butyl acrylamide was dispersed in 90 parts of water with a homomixer. To this was added 7.5 parts of a 40% Gentac latex and by gently stirring, the second treatment liquor was obtained.

A polyethylene terephthalate tire cord (250de/4/2, 51S x 51Z turns/10 cm.) was dipped in the first treatment liquor, after which it was heat treated for 2 minutes at 200° C. Next, it was dipped in the second treatment liquor, and after heat treating for 3 minutes at 170° C., it was placed in a hot press (136° C., 15 kg./cm.², 50 mins.) together with the unvulcanized rubber described in Example 1 and the vulcanization and adhesion operation was carried out. The so treated cord manifested a maximum adhesive force of 12.8 kg. and a cord breakage of 100% by means of the H-piece test.

EXAMPLE 16

First treatment liquor:

| | Parts |
|---|---|
| p,p'-Diphenylmethane bis(phenylurethane) | 5 |
| Aerosol-OT | 0.5 |
| 40% Gentac latex | 5 |
| Water | 89.5 |

Second treatment liquor:

| | |
|---|---|
| Glycidyl methacrylate | 5 |
| Methyl ethyl ketone | 25 |
| Polyoxyethylene stearyl ether | 0.8 |
| Water | 69.2 |

After dipping a polyethylene terephthalate tire cord (250de/4/2, 51S x 51Z turns/10 cm.) in the first treatment liquor, it was heat treated for 1.8 minutes at 220° C. Next, this cord was dipped in the second treatment liquor, after which it was heat treated for 2.2 minutes at 180° C. Then the vulcanization and adhesion operation thereof was effected as in Example 1. When 20 of the so obtained samples were tested by the H-piece test for their adhesive forces, the maximum and minimum were 12.6 kg. and 9.5 kg., respectively, and the average was 11.4 kg.

EXAMPLE 17

Except that hexamethylene bis(ethyleneurea) was used instead of p,p'-diphenylmethane bis(phenylurethane) and the heat treatment conditions subsequent to the treatment with the first treatment liquor was 2.4 minutes at 200° C., otherwise the procedures of Example 16 were followed. The results of the H-piece test on the cord samples obtained was 12.6 kg. for the adhesive force and above 80% for the cord break.

EXAMPLE 18

A fabric woven from polethylene terephthalate filaments was dipped in Desmodur R (trade name of Farbenfabriken Bayer A.G.) and heat treated for 5 minutes at 200° C., after which it was dipped in a 10% solution of glycidyl methacrylate in methylene chloride and heat treated for 3 minutes at 150° C. This was laid over the unvulcanized natural rubber described in Example 1 and vulcanization was effected for 50 minutes at a pressure of 15 kg./cm.² and a temperature of 136° C. By means of the Shopper method of measurement a stripping adhesive force of 11 kg./inch. was obtained.

Having thus described the invention, what we claim is:

1. A method for the adhesion of a polyester material to a rubber compound which comprises treating said material with a first treatment liquor containing an ethyleneimino compound of the formula

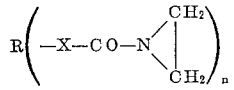

wherein X is NH or O; R is a polyvalent organic radical free from active hydrogen; and n is an integer of at least 2 and with a second treatment liquor containing an ethylenically unsaturated monomeric amide compound, followed by a heat treatment at a temperature of 100–250° C., and thereafter effecting the adhesion of the material to the rubber compound.

2. A method for the adhesion of a polyester material to a rubber compound which comprises treating said material with an aqueous treatment liquor containing an ethyleneimino compound of the formula

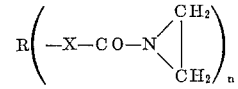

wherein X is NH or O; R is a polyvalent organic radical free from active hydrogen; and n is an integer of at least 2 and an ethylenically unsaturated monomeric amide compound, followed by a heat treatment at a temperature of 100–250° C., and thereafter effecting the adhesion of the material to the rubber compound.

3. A method in accordance with claim 2 wherein the ethylenically unsaturated amide compound is selected from the group consisting of acrylamide, N-methylol acrylamide, N,N'-methylene bis (acrylamide), tert-butyl acrylamide, methacrylamide N-methylol metharcylamide, N,N'-methylene bis (methacrylamide) and tert-butyl methacrylamide.

4. A method for the adhesion of a polyester material to a rubber compound which comprises treating said material with a treatment liquor containing an ethyleneimino compound of the formula

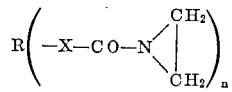

wherein X is NH or O; R is a polyvalent inorganic radical free from active hydrogen; and n is an integer of at least 2 and an ethylenically unsaturated amide compound selected from the group consisting of acrylamide, N-methylol acrylamide, N,N'-methylene bis (acrylamide), tert-butyl acrylamide, methacrylamide, N-methylol methacrylamide, N,N'-methylene bis (methacrylamide) and tert-butyl methacrylamide, subjecting the polyester material thus treated to a temperature of 160–230° C. for a period of about 20 seconds to about 6 minutes, and thereafter effecting the adhesion of the material to the rubber compound.

5. A method for the adhesion of a polyester material to a rubber compound which comprises treating said material with a first treatment liquor containing an ethyleneimino compound of the formula

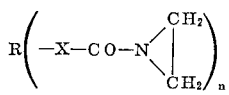

wherein X is NH or O; R is a polyvalent organic radical free from active hydrogen; and n is an integer of at least 2, heating the material treated with the first treatment liquor at a temperature of 150–250° C., treating the heat treated material with a second treatment liquor containing an ethylenically unsaturated amide compound, followed by a heat treatment at a temperature of 100–250° C., and thereafter effecting the adhesion of the material to the rubber compound.

6. A method in accordance with claim 5 wherein the ethylenically unsaturated amide compound is selected from the group consisting of acrylamide, N-methylol acrylamide, N,N'-methylene bis (acrylamide), tert-butyl acrylamide, methacrylamide, N-methylol methacrylamide, N, N'-methylene bis (methacrylamide) and tert-butyl methacrylamide.

7. A method for the adhesion of a polyester material to a rubber compound which comprises treating said material with a first treatment liquor containing an ethyleneimino compound of the formula

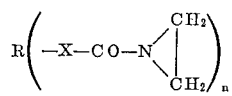

wherein X is NH or O; R is a polyvalent organic radical free from active hydrogen; and n is an integer of at least 2, heating the material treated with the first treatment liquor at a temperature of 160–230° C. for a period of 20 seconds to 6 minutes, treating the material thus treated with a second treatment liquor containing an ethylenically unsaturated amide compound selected from the group consisting of acrylamide, N-methylol acrylamide, N,N'-methylene bis (acrylamide), tert-butyl acrylamide, methacrylamide, N-methylol methacrylamide, N,N'-methylene bis (methacrylamide) and tert-butyl methacrylamide, subjecting the polyester material thus treated to a temperature of 160–230° C. for a period of about 20 seconds to about 6 minutes and thereafter effecting the adhesion of the material to the rubber compound.

8. A method for the adhesion of a polyester material to a rubber compound which comprises treating said material with a first treatment liquor containing an ethyleneimino compound of the formula

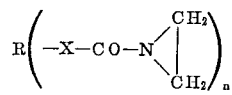

wherein X is NH or O; R is a polyvalent organic radical free from active hydrogen, and n is an integer of at least 2, and with a second treatment liquor containing an ethylenically unsaturated epoxy compound, followed by a heat treatment at a temperature of 100–250° C., and thereafter effecting the adhesion of the material to the rubber compound.

9. A method for the adhesion of a polyester material to a rubber compound which comprises treating said material with a treatment liquor containing an ethyleneimino compound of the formula

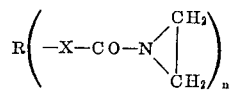

wherein X is NH or O; R is a polyvalent organic radical free from active hydrogen, and n is an integer of at least 2 and an ethylenically unsaturated epoxy compound, followed by a heat treatment at a temperature of 100–250° C., and thereafter effecting the adhesion of the material to the rubber compound.

10. A method in accordance with claim 9 wherein the ethylenically unsaturated epoxy compound is selected from the group consisting of glycidyl acrylate, glycidyl methacrylate and allyl glycidyl ether.

11. A method of the adhesion of a polyester material to a rubber compound which comprises treating said material with a treatment liquor containing an ethyleneimino compound of the formula

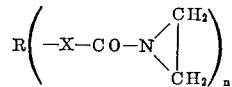

wherein X is NH or O; R is a polyvalent organic radical free from active hydrogen, and n is an integer of at least 2 and an ethylenically unsaturated epoxy compound selected from the group consisting of glycidyl acrylate, glycidyl methacrylate and allyl glycidyl ether, subjecting the polyester material thus treated to a temperature of 160–230° C. for a period of about 20 seconds to about 6 minutes, and thereafter effecting the adhesion of the material to the rubber compound.

12. A method for the adhesion of a polyester material to a rubber compound which comprises treating said material with a first treatment liquor containing an ethyleneimino compound of the formula

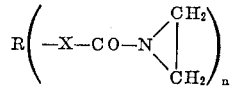

wherein X is NH or O; R is a polyvalent organic radical free from active hydrogen, and n is an integer of at least 2, heating the material treated with the first treatment liquor at a temperature of 150–250° C., treating the heat treated material with a second treatment liquor containing an ethylenically unsaturated epoxy compound, followed by a heat treatment at a temperature of 100–250° C., and thereafter effecting the adhesion of the material to the rubber compound.

13. A method in accordance with claim 12, wherein the ethylenically unsaturated epoxy compound is selected from the group consisting of glycidyl acrylate, glycidyl methacrylate and allyl glycidyl ether.

14. A method for the adhesion of a polyester material to a rubber compound which comprises treating said material with a first treatment liquor containing an ethyleneimino compound of the formula

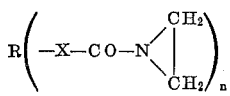

wherein X is NH or O; R is a polyvalent organic radical free from active hydrogen; and $n$ is an integer of at least 2, heating the material treated with the first treatment liquor at a temperature of 160–230° C. for a period of about 20 seconds to about 6 minutes, treating the material thus treated with a second treatment liquor containing an ethylenically unsaturated epoxy compound selected from the group consisting of glycidyl acrylate, glycidyl methacrylate and allyl glycidyl ether, subjecting the polyester material thus treated to a temperature of 160–230° C., for a period of about 20 seconds to about 6 minutes, and thereafter effecting the adhesion of the material to the rubber compounds.

References Cited by the Examiner

UNITED STATES PATENTS

| | | | |
|---|---|---|---|
| 2,826,526 | 3/1958 | Mayrick et al. | 156—331 |
| 2,850,424 | 9/1958 | Finelli et al. | 156—315 |
| 3,015,595 | 1/1962 | Moser et al. | 156—330 X |
| 3,063,958 | 11/1962 | Perkins et al. | 260—38 |
| 3,179,547 | 4/1965 | Kigane et al. | 156—315 |

EARL M. BERGERT, *Primary Examiner.*

HAROLD ANSHER, *Examiner.*